United States Patent [19]

Reynolds et al.

[11] 4,192,125

[45] Mar. 11, 1980

[54] RECIPROCATING FRUIT HARVESTER

[76] Inventors: Robert H. Reynolds; Elmo M. Reynolds, both of 202 Bedford St., C66, Sun City Center, Fla. 33570

[21] Appl. No.: 530,845

[22] Filed: Dec. 9, 1974

[51] Int. Cl.² .............................................. A01D 46/00
[52] U.S. Cl. .................................................. 56/328 R
[58] Field of Search .............................. 56/328 R, 330

[56] References Cited

U.S. PATENT DOCUMENTS

| | | | |
|---|---|---|---|
| 3,452,526 | 7/1969 | Steingas et al. | 56/328 R |
| 3,623,306 | 11/1971 | Reynolds et al. | 56/328 R |

*Primary Examiner*—Jay N. Eskovitz

[57] ABSTRACT

The instant device comprises groups of picking tubes mounted on two separate support bodies and having means to continuously reciprocate all picking tubes in an axially manner, a group of said tubes whereas when advanced into a tree pieces of fruit are drawn between said tubes in a contact grasping manner and rotated to separate said fruit from its stem and said fruit is held between tubes after separation from stem during period tubes are retracted from tree where fruit is freed and deposited in a receiving container mounted on the harvester unit.

5 Claims, 10 Drawing Figures

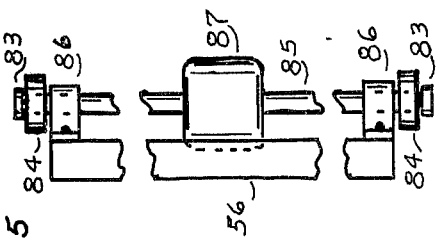
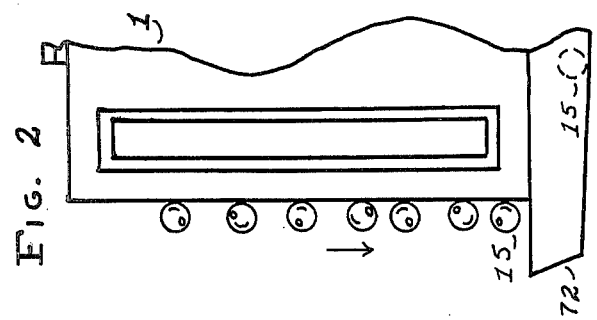
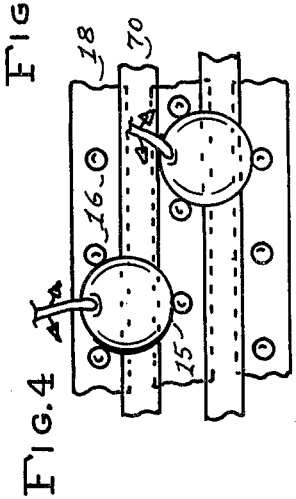
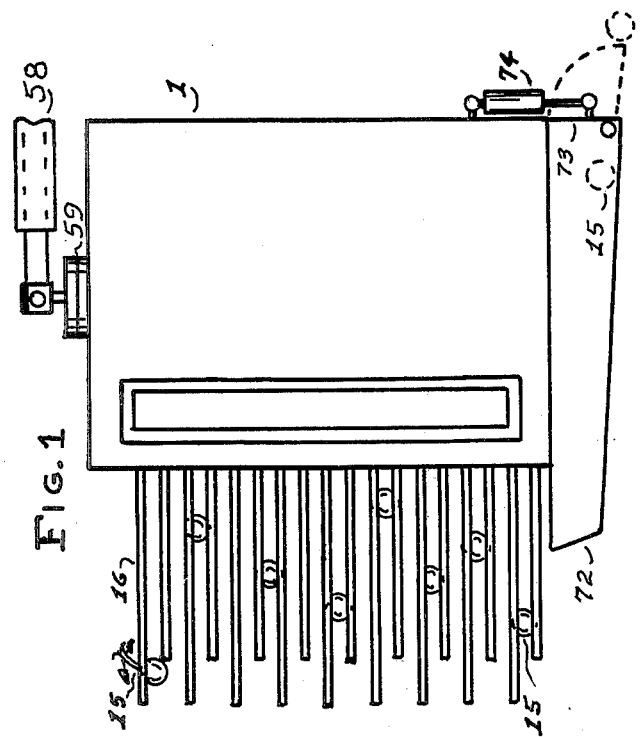
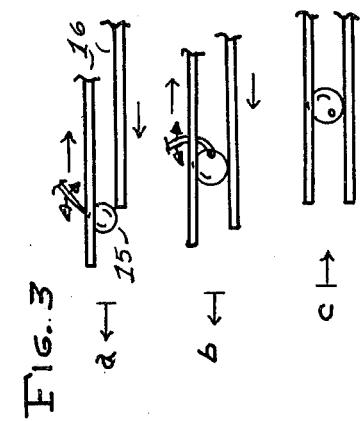

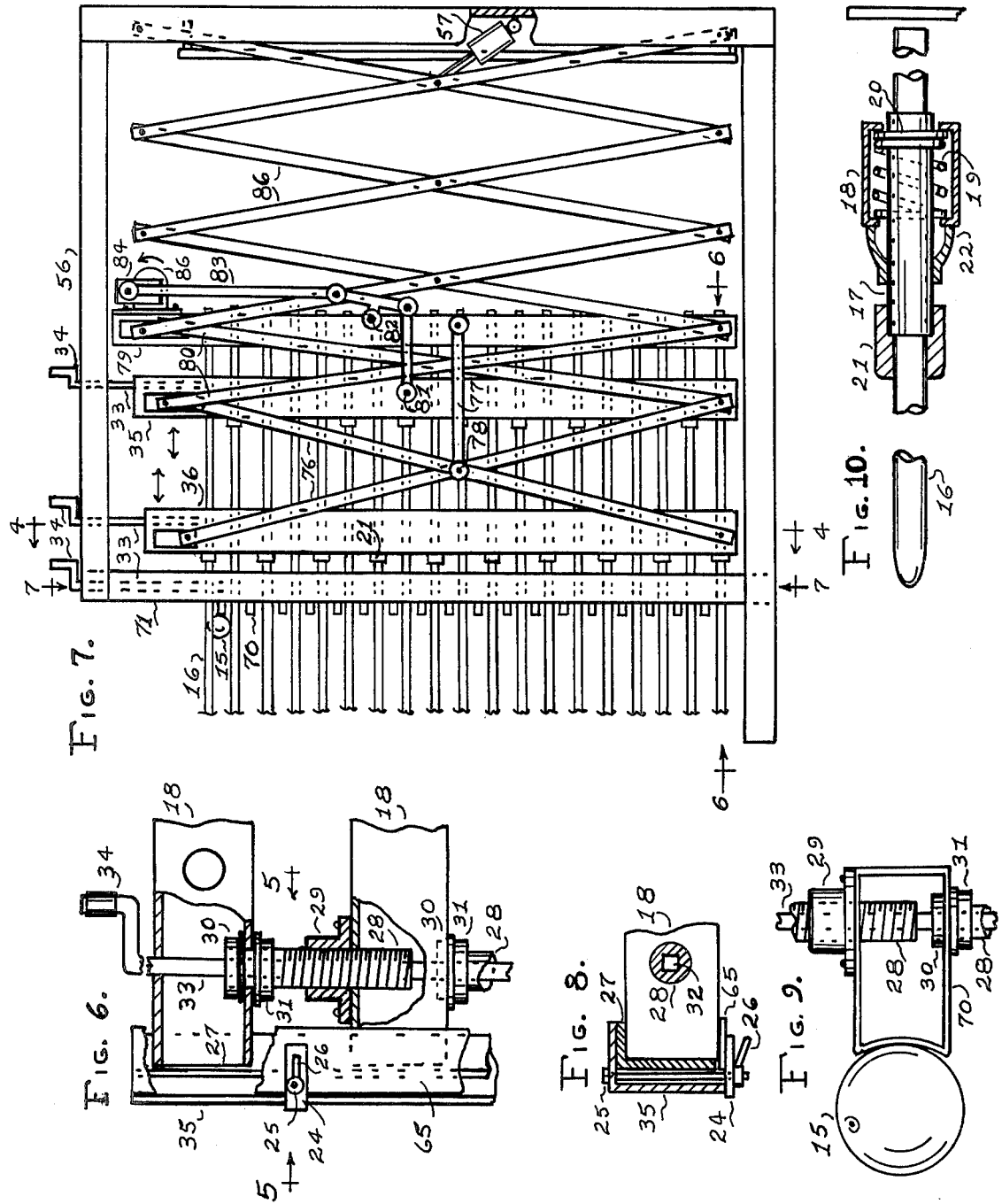

RECIPROCATING FRUIT HARVESTER

The instant device relates to an improved fruit harvester constituting improvements over the invention shown and described in application Ser. No. 674,955, filed Oct. 12, 1967, and now U.S. Pat. No. 3,534,535 and further constituting improvements over the invention shown and described in application Ser. No. 43,124, filed June 3, 1970, and now U.S. Pat. No. 3,623,306.

An important object of the present invention is to provide means of separating fruit from its stem by reciprocating tube means and the holding of picked fruit between and in the grasp of said tubes means while retreaving fruit from the tree, thereby, preventing fruit from falling downwardly through limb growth to the ground or to a ground catcher.

Another important object of the present invention is to provide means of freeing picked fruit from the grasp of tubes and depositing fruit in a receiving container secured directly to and beneath the harvester unit.

Another further important object of the present invention is to provide means of transferring picked fruit from said container to a ground vehicle trailer, thereby, preventing fruit from ground contact and reducing damage to fruit and reducing the handling procedures of fruit now commonly practiced.

Still another improved object of the present device is to provide scissor linkage support means for the two tube support bodies connected to reciprocating means.

Other important objects and advantageous features of the present invention will be apparent from the following description and the accompanying drawings, wherein, for purpose of illustration only, a specific form of the invention is set forth in detail.

In the drawings:

FIG. 1 is a side elevational enclosed view of harvesting unit with picking tubes in a forwardly extended manner from the unit and showing unit fixed in a moving manner to a manipulating boom means.

FIG. 2 is a side elevational view of a portion of the enclosed harvester unit with picking tubes inwardly retracted within the unit and showing picked fruit having been freed from picking tubes.

FIG. 3 is a side elevational view of portion of picking tubes reciprocating in opposite directions and including therein a diagrammatic showing of the separation of fruit from its stem and the holding of fruit between tubes as they are retracted from tree.

FIG. 4 is a front elevational view of a portion of a plurality of the fruit picking tubes and including therein a diagrammatic showing of the separation of fruit from its stem.

FIG. 5 is a portion of top plan view of the main frame supporting the reciprocating power means.

FIG. 6 is a side elevational enlarged sectional broken away view taken on the line 4—4 of FIG. 7 and showing the construction of mechanism for the purpose of changing the relative distances between tube support housings.

FIG. 7 is a side elevational view of harvester unit mechanism removed from FIG. 1 enclosure.

FIG. 8 is a sectional view taken on line 5—5 of FIG. 6 showing means of clamping the tube support housing to its support frame.

FIG. 9 is a end elevational enlarged portion of sectional broken away view taken on line 7—7 of FIG. 7 showing the construction of mechanism for the purpose of changing the relative distances between the fruit stop means.

FIG. 10 is a sectional enlarged view taken on the line 6—6 of FIG. 7 showing the mechanism disposed in the picking tube support housing.

Referring in detail to the drawings, wherein, like and related numerals designate like and related parts, the present device comprises a plurality of tubes arranged in horizontal rows. Said rows comprise the top row secured to one tube support body, a second row secured to the other tube support body, a third row secured to the first mentioned tube support body and this sequence is followed for the number of said rows desired. Each said body reciprocates respectively in opposite axially directions.

In FIG. 1, the mechanism shown in FIG. 7 is housed within the harvester unit 1, showing picking tubes 16 extended forwardly. Fruit 15 is shown after separation from stems and held within the grasp of tubes. Said unit is supported by means of maneuverable boom 58 which is mounted on a ground powered vehicle. Rotary 59 provides means of turning unit 1 in a manner to pick fruit from all trees within reaching distance of said boom.

In FIG. 2, the picked fruit 15 freed from grasp of tubes 16 are shown falling into container 72 after said tubes have been retracted within unit 1 and is described hereinafter in detail.

The purpose of showing FIG. 10 and the related description is to define the means whereby said tubes move transversely as hereinafter described. In FIG. 10 picking tube 16 is slidably disposed in a sleeve 17. One end portion of each tube is movably disposed in a large aperture on one side of the tube support housing 18 and the said one end of said sleeve is disposed through another smaller aperture on the other side of said housing. The periphery of sleeve 17 is maintained in housing 18 by tension of spring 19. One end of said spring is against the internal wall surrounding the larger aperture of said housing and the other end is compressed against shoulder 20 which is fixed to said sleeve. This compression forces said shoulder firmly against internal wall which surrounds and defines the smaller aperture of said housing. Frictional ring 21 is fixed on the other end of sleeve 17 and frictionally engages tube 16. Flexible cover 22 secured to said sleeve and frictionally engaging the external wall of said housing is for the purpose of preventing tree trash to enter said large aperture.

The purpose of showing FIGS. 6 and 8 and the related description is due to the adjusting means of FIG. 9 whereas, the adjustment of fruit bar 70 is closely related to and reference is made therein to the adjustment of said tubes supported by housings 18. In FIGS. 6 and 8, housing 18 is clamped on one end within support body frame 35 and 36 respectively by clamping means comprising plate 24, bolt 25, clamping nut 26 and holding plate 65 and the other end of said housing is clamped by identical means. Said clamps are spaced sufficiently in numbers on said frame to secure all of said housings in a like manner. Spacing angle 27 having its narrow side fixed to frames 35 and 36 respectively is for the purpose of a placement guide for said housing. The other end of said housing is guided by identical means. To provide means for changing the relative distance between each of all said identical housings 18 a threaded circular elongated spacer 28 is disposed movably in a compatible threaded female fitting 29 which is fixed to upper side of housing 18 near one end. The upper one end of said spacer is disposed in an aperture in the lower side of another housing 18 and is maintained there by collars 30 and 31 in a movable manner. The internal portion of said spacer is formed whereas a square aperture 32 is provided through the entire length of said spacer. The square adjusting rod 33 having a crank 34 on the upper one end is slidably disposed in aperture 32 and extends downwardly into all other identical housings having identical means as herein described. The rotating of said rod in one direction rotates spacers 28, after said clamping means have been loosened, such that the threaded mechanism changes the related distance of said housings to a closer relationship to each other and the rotating of said rod in the other direction changes the relative distance of said housings to a farther apart relationship to each other. After making said changes, said clamping means are tightened. Said mechanism is provided for each end of said housing and for all similar housings in identical manner. The purpose of said changes of distances between picking tubes is to provide means of picking different varieties and noticeable differences in fruit sizes.

FIG. 9, a fruit stop bar 70 means is identical in adjusting mechanism means as in the description above describing FIGS. 6 and 8, clamping means comprising plate 24, bolt 25, clamping nut 26 and holding plate 65 is not required to maintain bar 70 in frame 71. The purpose of changing the relative distances of said means is to adjust accordingly to the changes when picking tube housings 18 distances are re-adjusted. In FIG. 4 the fruit stop bars 70 are shown in front of housings 18. Said bars are disposed in fixed frame 71 in a movable upwardly and downwardly adjustable manner and are shown in area between rows of tubes 16 in FIG. 7. Frame 71 is fixed to main frame 56. Bars 70 are disposed in area between each said rows of tubes 16 for the purpose of stopping the inwardly movement of picked fruit 15 held within the grasp of said tubes, thus freeing fruit from tubes as tubes are fully retracted within unit 1 enclosure as shown in FIG. 2. Said separation of fruit from stem and the manner of grasping of fruit by said tubes is shown in FIG. 3.

In FIG. 1, container 72 fixed to main frame 56 extends outwardly sufficiently to receive fruit 15 released from grasp of tubes 16 as shown in FIG. 2. When said container is filled to capacity the picked fruit is released from said container into ground vehicle or container by gravity flow through means of an end door 73 activated by cylinder 74 which is activated by an auxiliary source.

In FIGS. 1 and 7, a desired number of picking tubes 16 and tube support housings 18 are arranged in two movable tube support body groups herein after referred to as first movable body 35 and second movable body 36. Both are identical in structure and performance. Both bodies 35 and 36 are supported vertically and maintained in opposite reciprocating relationship by scissor linkage means 76 having its ends connected in a movable manner to said bodies. Horizontal stabilizer arm 77 has one end pivotally connected to support frame 79 and the other end pivotally connected to center axis 78 of scissor linkage 76 for the purpose to maintain a fixed center manner position of said axis in relationship to the reciprocation of bodies 35 and 36. Scissor linkage 80 having its ends fixed in a movable manner to body 35 and to support frame 79 respectively provides the support means of body 35 in a reciprocating manner which moves said body forwardly and backwardly in relationship to said frame. All of the above described component parts of FIGS. 1 and 7 are identical on both sides of the said unit.

In FIGS. 7 and 5, one end of arm 81 is fixed in a movable manner to body 35 and its other end is fixed in a movable manner to one of the ends of rocker arm 82 and having its middle portion pivotally connected to frame 79. The other end of arm 82 is fixed in a movable manner to connecting rod linkage 83 and said linkage having its other end fixed to crank 84 in a movable manner. Said crank is secured to shaft 85 which is supported by bearing 86. Said shaft is fixed to motor 87 and is rotated in a continuous manner during the picking cycle. Said motor is activated by an auxiliary source. The said rotation by connecting means herein above described provides means of moving body 35 forwardly and backwardly in a horizontal manner and in so doing said body moves body 36 in opposite horizontal movements by linkage 76 means, thus provides means of reciprocating tubes 16.

In FIG. 7, support frame 79 is moved horizontally outwardly and inwardly within frame 56 by support means of scissor linkage 86 which has its ends fixed in a movable manner to frames 56 and 79 respectively. Cylinder 57 is pivotally connected to frame 56 and to scissor linkage 86 and is activated by an auxiliary source for the purpose of moving the picking tubes 16 into and out of a tree.

In FIG. 3, a piece of fruit 15 is shown in contact with picking tubes 16. In FIG. 3a, the two tubes are shown in a manner of advancing into a tree. The top tube is shown moving horizontally inwardly and the bottom tube is shown moving horizontally outwardly. The stem's natural clinging characteristics to its fruit during the straight pulling force is normally sufficient to allow fruit to be drawn between tubes 16 during the inwardly reciprocation of tubes into a tree, as shown in FIG. 4. In FIG. 3b, fruit is shown having been drawn into the grasp of tubes due to slight movement transversely of said tubes. In FIG. 10, spring 19 provides the said movement transversely. The opposite reciprocating movement of said tubes rotates said fruit and in the rotation fruit is place in an oblique relationship manner with its stem, thus separating fruit from its stem which is similar to hand picking of fruit. In FIG. 3c, said fruit is shown held between and within the grasp of said tubes during their retracting movement out of tree as heretofore described.

In FIG. 4, a portion of front elevational enlarged view shows the first and third rows of picking tubes 16 and their supporting housings 18 which are connected to first support body 35 and the second row of said tubes and housing 18 which is connected to the second support body 36. Fruit stop bars 70 which are connected to frame 71 are shown in relationship to said tubes.

Although there have been shown and described herein preferred forms of the invention, it is to be understood that the invention is not necessarily confined thereto, and that any change or changes in the structure of and in the relation arrangements of components thereof are contemplated as being within the scope of the invention as defined by the claims appended hereto.

What is claimed is:

1. A fruit harvesting unit comprising a main frame, a movable support frame mounted on said main frame, a first and second movable tube support bodies mounted on said movable support frame, a first scissor linkage mounted on said first tube support body and connected to said second tube support body, a second scissor linkage mounted on said movable support frame and connected to said second tube support body so as to reciprocate said two movable support bodies in opposite directions, at least two elongated tubes having one end mounted on one body of said two movable tube support bodies, at least one elongated tube disposed adjacent said first mentioned tubes and having one end mounted on the other said movable tube support body and free end disposed behind free ends of said first mentioned tubes and defining with first mentioned tubes an area for receiving individual pieces of fruit for harvesting such that upon the disposal of a piece within said area and axially movement of first said mentioned movable tubes relative to the opposite axially directed movement of said other mentioned movable tube, said piece of fruit is drawn within the grasp of said tubes, rotated and in the process is separated from its stem and said fruit is held after separation from stem within the grasp of said tubes during the outwardly withdrawal period of tubes from tree.

2. The device according to claim 1 wherein a stabilizer arm is connected on axis of said first scissor linkage and connected to said movable support frame.

3. The device according to claim 1 wherein an activating source connected to said second tube support body so as to reciprocate said body and in so doing reciprocates said first tube support body.

4. The device according to claim 1 wherein at least one fruit stop bar mounted on said main frame and defining an area relationship between said two tubes and said one tube so as to stop inwardly movement of a said piece of fruit separated from stem held within grasp of said tubes during retraction movement of said tubes into said harvesting unit and in the process said fruit is freed from the said grasp of said tubes.

5. The device according to claim 1 wherein a door connected to receiving container is activated so as to provide passage way of said fruit from said container.

* * * * *